United States Patent [19]

Lehmann

[11] 3,753,605

[45] Aug. 21, 1973

[54] ANTI-FRICTION BEARING ASSEMBLAGE WITH CENTRIFUGAL FILM LUBRICATION ON CAGE SURFACES

[76] Inventor: Kenneth G. Lehmann, 5 Kent Rd., Easton, Conn. 06612

[22] Filed: July 6, 1971

[21] Appl. No.: 159,707

[52] U.S. Cl. ............................................... 308/187
[51] Int. Cl. ............................................ F16c 33/30
[58] Field of Search ............................ 308/201, 187

[56] References Cited
UNITED STATES PATENTS

| 2,838,348 | 6/1958 | Hamm | 308/187 |
| 2,897,024 | 7/1959 | Chenea | 308/201 |
| 3,179,478 | 4/1965 | Readdy | 308/187 |
| 3,582,164 | 6/1971 | Derner | 308/201 |

Primary Examiner—Charles J. Myhre
Assistant Examiner—S. Frank Susko
Attorney—H. Gibner Lehmann

[57] ABSTRACT

An anti-friction bearing assemblage comprising two race members with rolling bearing elements held captive between the members. The illustrated embodiment shows ball bearings; however, roller bearings may be utilized as well. Uniform spacing is maintained between the roller elements by a multi-part cage comprising a pair of circular flat side rings between which hollow-surfaced spacer blocks are secured. The spacer blocks alternate with the roller elements of the bearing, and have concave surfaces closely conforming thereto. Reliefs are provided on the concave surfaces of the spacer blocks to provide leading or entrance cavities which hold the oil or grease lubricant. At one concave surface of each spacer block the reliefs communicate with a lubricant feed slot which in turn communicates with radially extending passages disposed in the blocks. Side edges or surfaces of the blocks are sloped and constitute a camming means which tends to force radially inward the oil or grease lubricant. Under centrifugal action such lubricant is conducted to the relief surfaces of the blocks, where it is picked up by the surfaces of the roller members so as to form continuous lubricating films between the roller members or balls on the one hand and the spacer blocks on the other hand. Maximum lubrication and minimum friction between the rolling elements and the blocks constituting the cage are therefore attained, being aided by centrifugal force as the turnable portions of the bearing rotate, this being in addition to the cohesion of lubricant on the surfaces of the elements.

5 Claims, 8 Drawing Figures

Patented Aug. 21, 1973 3,753,605
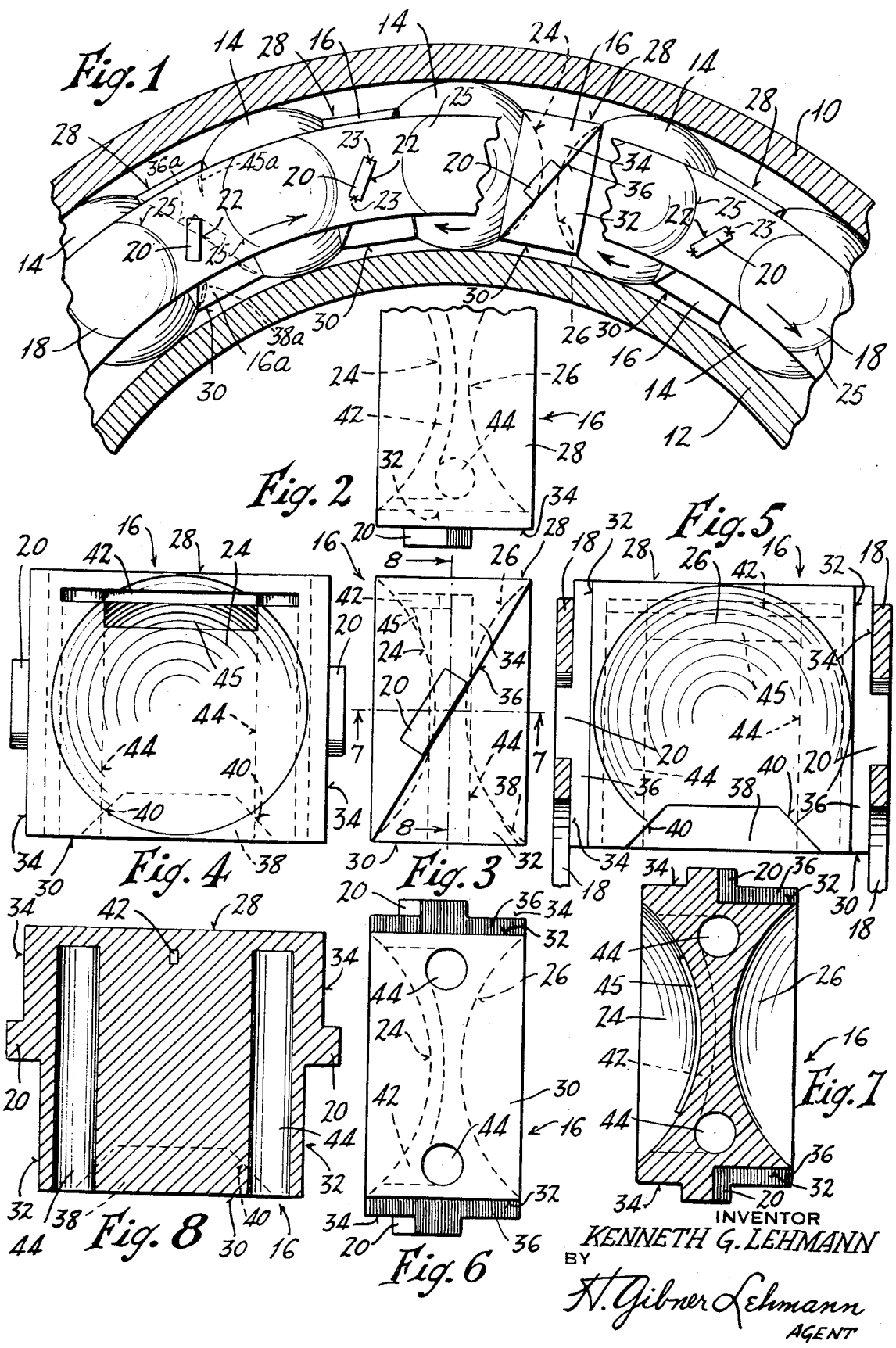
INVENTOR
KENNETH G. LEHMANN
BY
H. Gibner Lehmann
AGENT

ANTI-FRICTION BEARING ASSEMBLAGE WITH CENTRIFUGAL FILM LUBRICATION ON CAGE SURFACES

BACKGROUND

This invention relates to anti-friction bearing assemblages, such as ball bearings, roller bearings and the like, wherein the rolling elements or members are kept in spaced apart relation by a cage having portions interposed between the members. Heretofore it has been a common practice to maintain the spacing between ball or roller elements of an assemblage by means of a formed sheet metal cage having portions or lugs extending between or engaged with the elements in such a manner as to mechanically separate the same. Such separation was accompanied by a scraping action applied to the roller elements by the cage portions, which had an adverse effect in that it tended to remove lubricant and was not conductive to the maintaining of a continuous lubricating film. In other bearing assemblages where such scraping action was not so pronounced, the result of centrifugal forces on heated lubricant in a rapidly turning bearing was such that inner portions of the bearing could sometimes become starved of lubricant and film, particularly where no provision was made for effecting a recirculating of the lubricant against the action of the centrifugal forces. As a consequence, in these prior bearings failure occurred most frequently due to the objectionable conditions resulting from the presence of the spacer cage or means by which the roller elements were prevented from touching each other. In some bearings where spacer cages were not provided, the roller elements if allowed to touch each other created an undesirable condition in that relatively small areas of contact existed, having high relative speeds or movements with little or no effective film lubrication and isolation. Here again, the failure of the bearing was due to the inadequacy or impossibility to effectively maintain with little friction and adequate lubrication a spacing between adjoining roller elements.

SUMMARY

The above drawbacks and disadvantages of prior anti-friction bearing assemblages are obviated by the present invention, which has for one object the provision of an improved anti-friction bearing having spaced apart races and roller or ball elements engaged with the races, wherein an effective spacing of the roller or ball elements is maintained with the least amount of friction or drag, and with an effective lubricating film maintained between the spacer means and roller elements, such film being aided by centrifugal force in addition to the cohesive action between the moving surfaces of the elements and the lubricant. This is accomplished by a novel cage construction comprising, in the illustrated embodiment, a pair of spaced apart flat cage rings disposed on opposite sides of the row of roller or ball elements and by unique spacer blocks disposed between and secured to the cage rings and alternating with the roller or ball elements, said blocks having concave surfaces engaged with the roller elements and having reliefs on such surfaces which are fed lubricant under the action of centrifugal forces, there to be picked up by the moving surfaces of the roller elements so as to create an effective lubricating film between the elements and the blocks. The blocks also have sloped or camming surfaces which tend to force the lubricant radially inward against the action of centrifugal force, and have radially extending passages for the lubricant, through which the latter is forced under the action of centrifugal force to outermost relief areas of the concave surfaces for pick-up by the ball or roller elements. The net result is that of forced lubrication of the cooperable or engaging surfaces of the roller elements and the spacer blocks, despite the action of centrifugal force when the bearing is rotating at high speeds and high temperatures.

Other features and objects of the invention reside in the provision of an improved anti-friction bearing assemblage as above set forth, wherein the novel cage structure comprises relatively simple parts which may be economically fabricated and quickly and easily assembled, and wherein the cage is especially sturdy and reliable in its functioning, thereby resulting in a bearing which is adapted to withstand severe conditions of use without consequent shortening of life or failure.

Still other features and advantages will hereinafter appear.

In the accompanying drawings:

FIG. 1 is a fragmentary transaxial sectional view of an anti-friction bearing assemblage embodying the invention, portions being broken away to reveal interior details.

FIG. 2 is a fragmentary top plan view of one of the spacer blocks of the multi-part bearing cage.

FIG. 3 is a side elevational view of a spacer block of the cage.

FIG. 4 is a rear elevational view of the spacer block.

FIG. 5 is a front elevational view of the spacer block, this view also showing portions of the flat side rings of the cage assemblage.

FIG. 6 is a bottom plan view of the spacer block.

FIG. 7 is a horizontal section, taken on the line 7—7 of FIG. 3.

FIG. 8 is a vertical section, taken on the line 8—8 of FIG. 3.

Referring first to FIG. 1, the improved bearing illustrated therein comprises an outer race member 10 and an inner race member 12, both of conventional construction. Disposed between the outer and inner race members 10, 12 are anti-friction roller balls 14, engaged with the race surfaces of the members 10, 12. The parts 10, 12 and 14 may all be of conventional construction.

In accordance with this invention there is provided a novel and improved cage assemblage for maintaining a uniform spacing between the ball elements 14 while at the same time reducing friction between the cage and elements to a minimum and maintaining an anti-friction lubricating film therebetween, aided by centrifugal force when the bearing is rotating at high speeds. The improved cage assemblage comprises a plurality of spacer blocks 16 which are disposed between and secured to a pair of flat side cage rings 18. In effecting such securement the blocks 16 are provided with mounting lugs 20 of rectangular configuration, which are accommodated in rectangular slots 22 provided in the rings 18. The lugs 20 may be swaged or otherwise drifted to securely hold them in the slots 22, or they may be welded to the edges of the slots as illustrated at 23 in FIG. 1.

The side rings 18 of the cage assemblage have bulges 25 to provide clearance for the ball elements 14 whereby the latter at no places engage the cage rings.

Considering FIGS. 1–8, the spacer blocks 16 are all identical to each other, and this same is also true of the two side rings 18 of the cage construction. Each spacer block 16 has a concave or partly spherical trailing surface 24 and a concave or partly spherical leading surface 26 conforming exactly to the spherical surfaces of the ball elements 14. The spacer blocks 16 may be formed of a tough, heat-resistant low-friction plastic material, by a molding process, or else the blocks may be forced of powdered metal or a mixture of metal and graphite or other lubricant, which is compressed in molds and subjected to heat while under pressure so as to solidify the powdered metal into the desired shape or configuration.

In accordance with the invention, the upper portion of the trailing concave surface 24 of each block 60 is provided with a relief or recessed surface 45, and the lower portion of the leading concave surface 26 of the block 16 is provided with a relief or recessed surface 38, the latter being defined by sloping edges 40 as illustrated in FIGS. 4 and 5.

The spacer block 16 has a top surface 28 and a bottom surface 30, and has inwardly offset side surfaces 32 and outer side surfaces 34 which are separated by camming edges or shoulders 36 whose function is to cam inward the oil or grease lubricant as the bearing is rotating under high speed. The direction of such rotation is indicated by the arrows in FIG. 1. It will be seen that the blocks 16 and the side rings 18 of the cage construction will be turning clockwise, whereby the side camming surfaces or shoulders 36 of the blocks will then be camming radially inward the oil or grease lubricant of the bearing.

Referring to FIGS. 3–5 and 8, the upper or outer portion of the block 16 is provided with a transverse slot 42 which communicates with the relief surface 45. At its ends, the slot 42 communicates with radially extending lubricant passages 44 which open at the bottom surface 30 of the spacer block 16.

The operation of the improved anti-friction bearing of the invention can now be readily understood. It will be noted that the cage construction comprising the two side rings 18 and the plurality of spacer blocks 16 constitutes a rigid assemblage whereby centrifugal forces acting on the spacer blocks will be counteracted by the side rings 18 and will not require any counter-action on the part of the roller elements or balls 14. With the bearing turning in the direction of the arrows in FIG. 1, lubricant will continually be forced inward or toward the bearing axis by the side camming surfaces 36 of the blocks, and such lubricant will enter the cavity provided by the relief or recessed surface 38 of the blocks. Such lubricant, in contact with the adjoining surfaces of the balls 14, will be carried by the ball surfaces so as to constitute a continuous thin film of lubricant between the ball and the leading faces 26 of the blocks. Also, under the action of centrifugal force the lubricant will travel radially outward or upward (as seen in FIG. 8) through the passages 44 of the blocks, and then will be forced laterally along the grooves or slots 42, thereby to be brought in contact with other surfaces of the balls 14. The surfaces of the ball elements 14, picking up the lubricant from the slots 42, will fill the relief areas 45 and thereafter the lubricant will be carried by the surfaces of the balls 14 so as to form a continuous friction-reducing film on the trailing surfaces 24 of the spacer blocks 16. It will be noted that the oil or grease lubricant occupying the relief cavities 38 will tend to travel over the leading surfaces 26 of the blocks 16 under the action of centrifugal force, whereas the film on the trailing surfaces 24 will be carried against the action of centrifugal force. However, such counter travel of the lubricant will readily occur, due to the fact that the lubricant contained in the radial passages 44 will be acted on powerfully by centrifugal force, this being transmitted to the slots 42 and the relief cavities 45. Thereafter, the coating of the surfaces of the balls 14 at the cavities 45 will result in a positive film formation on the trailing edges 24 of the spacer blocks 16, by cohesive forces which overcome the centrifugal force insofar as the lubricating film is concerned on the surfaces 24.

It will now be understood from the foregoing that I have provided a novel and improved anti-friction bearing assemblage with novel bearing cage construction which permits close spacing of the ball elements 14 so as to maximize the load-carrying ability of the bearing. Further, friction involves with the ball elements 14 is reduced to a minimum due to the lubricating films maintained between the balls and the spacer blocks 16. The effect is very much like that of forced lubrication under a centrifugal pump action except that in the present instance the centrifugal action on the lubricant is utilized to bring the latter to the leading or introducing cavities 38, 45 where a lubricant coats the surfaces of the balls 14. Due to the wedge-shape of the cavities 38, 45 the lubricant is forced onto the leading and trailing edges 26, 24 respectively, thereby to positively insure an unbroken complete film between the balls 14 and spacer blocks 16 at all times.

While in the illustrated embodiment of the invention the rotating elements are in the form of balls, it will be readily understood that rollers may replace the balls, and that the spacer blocks 16 may have concave surfaces suited to the peripheral surfaces of such rollers.

Whereas the leading edges 26 of the spacer blocks 16 are shown as having only the introducing cavities 38, such leading surfaces may as well be provided with upper cavities like the cavities 45 on the trailing surfaces 24, and additional slots may connect such cavities with the radial passages 44 in the same manner that the slots 42 provide conduction between the radial passages 44 and relief cavities 45. Also, the trailing edges 24 may be provided with reliefs like 38, at the lower portions of the spacer blocks 16. When this is done, the bearing becomes a bi-directional bearing, whereas with the embodiment illustrated herein the bearing is intended mainly to be run in one direction only.

In FIG. 1, a block 16a is illustrated as having introduction cavities 38a and 45a on both the leading and trailing surfaces thereof, in accordance with the above suggested modification of the invention, by which the bearing can function when rotated in either of opposite directions. The block 16a can have one camming edge 36a acting opposite to the other camming edge 36, to circulate lubricant during reverse turning.

It will now be understood that I have provided a novel and improved anti-friction bearing which is capable of operating under severe conditions involving high loads and high temperatures, without failure being caused due to increased friction between the roller or ball elements and the cage maintaining the spacing of such elements.

Variations and modifications are possible without departing from the spirit of the invention.

I claim:

1. An anti-friction bearing comprising, in combination:
   a. a pair of annular, coaxial race members extending alongside each other in spaced relationship, said members having race surfaces disposed opposite and facing each other,
   b. anti-friction roller elements disposed between and engaged with said race surfaces,
   c. spacer blocks located between the roller elements, each of said blocks having a pair of concave surfaces engaged with surfaces of adjacent pairs of said elements,
   d. annular means attached to said spacer blocks, retaining the latter positioned between and engaged with the roller elements,
   e. said spacer blocks having relieved faces respectively adjoining and merging with said concave surfaces and forming with adjoining surfaces of the roller elements lubricant-collecting cavities,
   f. said relieved faces being disposed at those peripheral portions of the concave surfaces which are leading as opposed to trailing, considering one given direction of turning of the elements,
   g. each spacer block having a passage in and extending through it for lubricant, communicating directly with one of said relieved faces,
   h. said passage opening at those surfaces of the blocks which are disposed closest to the axis of the race members.

2. A bearing as in claim 1, wherein:
   a. each spacer block has two of said passages for lubricant, and has a slot connecting the passages with one of said relieved faces.

3. An anti-friction bearing comprising, in combination:
   a. a pair of annular, coaxial race members extending alongside each other in spaced relationship, said members having race surfaces disposed opposite and facing each other,
   b. anti-friction roller elements disposed between and engaged with said race surfaces, and
   c. a cage having spacer portions located between the roller elements to maintain a separation between the latter,
   d. said cage having surfaces sloped to force lubricant radially inward toward the axis of the race members against centrifugal force as the cage travels in a circle.

4. A bearing as in claim 3, wherein:
   a. some of said sloped surfaces force lubricant radially inward toward said axis for travel of the cage in one direction, and other sloped surfaces force lubricant radially inward toward the axis for travel of the cage in an opposite direction.

5. An anti-friction bearing comprising, in combination:
   a. a pair of annular, coaxial race members extending alongside each other in spaced relationship, said members having race surfaces disposed opposite and facing each other,
   b. anti-friction roller elements disposed between and engaged with said race surfaces,
   c. spacer blocks located between the roller elements, each of said blocks having a pair of concave surfaces engaged with surfaces of adjacent pairs of said elements,
   d. annular means attached to said spacer blocks, retaining the latter positioned between and engaged with the roller elements,
   e. said spacer blocks having relieved faces adjoining and merging with said concave surfaces and forming with adjoining surfaces of the roller elements lubricant-collecting cavities,
   f. said relieved faces being disposed at those peripheral portions of the concave surfaces which are leading as opposed to trailing, considering one given direction of turning of the elements.
   g. each of said spacer blocks having relieved faces on both of its concave surfaces,
   h. the spacer blocks having passages in and extending through them for lubricant, communicating directly with said relieved faces,
   i. said passages opening at those surfaces of the blocks which are disposed closest to the axis of the race members,
   j. the spacer blocks having sloped edges adapted to force lubricant toward the axis of the race members as the blocks travel in a circle in one direction.

* * * * *